Patented Nov. 12, 1935

2,021,093

UNITED STATES PATENT OFFICE 2,021,093

PROCESS FOR PRODUCING COARSE CRYSTALLINE AMMONIUM SULPHATE AND PRODUCT THEREOF

Andreas von Kreisler, Frankfort-on-the-Main, Germany

No Drawing. Application August 26, 1933, Serial No. 687,006. In Germany August 29, 1932

12 Claims. (Cl. 23—119)

Ammonium sulphate as a fine crystalline powder is produced by introducing synthetic gaseous ammonia into sulphuric acid. This powder is neither capable of adhering nor of being strewn and is easily blown away when lying on the field. Moreover, it possesses the objectionable property of caking under its own weight and becoming hard when stored.

Various measures have been proposed for producing coarse crystalline ammonium sulphate; thus, for example, it is known to assist the growing of the crystals by slowly cooling the salt lye in the condition of rest or to favour the crystallization by uniformly moving the lye in jigging troughs. All these processes preclude continuous work in a saturator or require expensive plants.

It has likewise been proposed, to assist the formation of crystals of ammonium sulphate by adding foreign substances such as naphthalene, aromatic sulpho-acid, clay, iron and the like into the saturator. These processes produce an impure ammonium sulphate. When employed for fertilizing, it has to be taken in consideration that the additional substances hitherto proposed do not possess any favorable vegetable physiological properties and therefore reduce the fertilizing value of the ammonium sulphate.

It has been found, that ammonium sulphate in coarse crystals is obtained if the crystallization is carried out under certain conditions of concentration and with the simultaneous addition of carbamide. As carbamide, owing to its high percentage of nitrogen, is an excellent fertilizer it cannot reduce the fertilizing effect of the ammonium sulphate.

As a rule the addition of carbamide in quantities of 1 to 10, preferably 2 to 6%, is already sufficient to produce larger crystals. The carbamide may be added to the sulphuric acid before the saturation or to the ammonium sulphate lye before the beginning of the crystallization. However, it has been found, that this addition has a particularly favourable effect under certain conditions of concentration.

It is, for example, advisable to work so that the lye at the beginning of the crystallization contains 100 parts of salt to 100 parts of water and 2 to 8 parts of free acid. It is particularly advantageous to add to this lye 2 to 3 parts of carbamide. The lye is then evaporated. This evaporation may be carried out in a vacuum. It is also possible to add continually sulphuric acid, ammonia and water to the mother lye as soon as crystals separate. The added quantities of these substances must be so chosen, that they are equivalent to the drawn off ammonium sulphate and evaporating water, so that the lye always retains its composition. The heat of neutralization effects the evaporation of the water. If required, the solution may be maintained at the desired temperature by ordinary or superheated steam, but the additional heat is not absolutely necessary. When working under these conditions a coarse crystalline ammonium sulphate is obtained, which is continually discharged or removed from the saturator. The dry ammonium sulphate consists of large, well formed crystals and possesses excellent adhesive and strewing properties. The greater part of the carbamide remains dissolved in the mother lye and must only be renewed from time to time. The separated ammonium sulphate crystals contain carbamide in quantities from 0.1 to 0.5%.

*Examples*

1. 2 parts of carbamide were added to 100 parts of lye in a saturator, which is operated with a sulphuric acid of 60° Bé. and concentrated gaseous ammonia so that the lye always contained 80 grs. of free acid per litre. The ammonium sulphate separated in large crystals. The same method, without the addition of carbamide yielded, however, fine crystalline powder.

2. A lye containing to 100 parts of ammonium sulphate, 100 parts of water, 2 parts of sulphuric acid and 6 parts of carbamide, was treated in a saturator. To the lye equivalent quantities of sulphuric acid and ammonia were continuously added. The larger portion of the separating ammonium sulphate consisted of well formed large crystals.

3. In a saturator a lye was treated, containing 100 parts of water, 4 parts of acid and 3 parts of carbamide per 100 parts of salt. The saturator works under superatmospheric pressure. The quantity of the separating salt corresponds approximately to the quantity of the evaporating water. Ammonia and diluted sulphuric acid were added to the lye in equivalent quantities. The ammonium sulphate obtained represents large crystals.

4. 175 grs. of water were evaporated at 105° C. from a lye, containing 1075 grs. ammonium sulphate, 80 grs. free sulphuric acid and 20 grs. carbamide per litre of water. The lye was then filtered at 100° C. and the 180 grs. ammonium sulphate obtained subjected to a sifting test. 82% of the salt were kept back by a standard sieve with a 0.49 mm. mesh width.

The addition of carbamide, proposed according to the invention, exerts an excellent, always uniform influence upon the growth of the ammonium sulphate crystals in very different shapes. The form of the crystals depends upon the temperature of crystallization, the concentration of the solution, the cooling speed, the percentage of acid in the solution and upon other conditions. Moreover, the carbamide is advantageously distinguished from other admixtures thereby that it has no doubtful or detrimental vegetable physiological properties, but is itself an excellent fertilizer.

The coarse crystalline ammonium sulphate obtained according to the present process is therefore not contaminated by any foreign substances, which might detrimentally affect its employment for fertilizing purposes, and at the same time capable of adhesion and being strewn.

I claim:—

1. A process for the production of coarse crystalline ammonium sulphate from synthetic ammonia, consisting in crystallizing the ammonium sulphate from its aqueous solution with addition of 2 to 6 parts of carbamide per 100 parts of ammonium sulphate.

2. A process for the production of coarse crystalline ammonium sulphate from synthetic ammonia, consisting in adding 1 to 10 parts of carbamide to 100 parts of a solution of ammonium sulphate, and in bringing to crystallizing the ammonium sulphate whilst continually adding synthetic ammonia and sulphuric acid.

3. A process for the production of coarse crystalline ammonium sulphate from synthetic ammonia, consisting in adding 1 to 10 parts of carbamide to 100 parts of a solution of ammonium sulphate, crystallizing the solution, and continually adding synthetic ammonia and sulphuric acid in such quantities that the lye is permanently maintained at its initial concentrations.

4. A process for the production of coarse crystalline ammonium sulphate from synthetic ammonia, consisting in dissolving ammonium sulphate in water, in adding 1 to 10 parts of carbamide to 100 parts of the solution, and in crystallizing the solution.

5. A process for the production of coarse crystalline ammonium sulphate from synthetic ammonia, consisting in crystallizing under superatmospheric pressure the ammonium sulphate from its aqueous solution whilst adding 1 to 10 parts of carbamide per 100 parts of the solution.

6. A process for the production of coarse crystalline ammonium sulphate from synthetic ammonia, consisting in crystallizing under reduced pressure the ammonium sulphate from its aqueous solution whilst adding 1 to 10 parts of carbamide per 100 parts of the solution.

7. A process for the production of coarse crystalline ammonium sulphate from synthetic ammonia, consisting in crystallizing the ammonium sulphate from its aqueous solution whilst adding 1 to 10 parts of carbamide per 100 parts of the solution and introducing steam.

8. A process for the production of coarse crystalline ammonium sulphate from synthetic ammonia, consisting in crystallizing the ammonium sulphate from its aqueous solution whilst adding 1 to 10 parts of carbamide to 100 parts of ammonium sulphate.

9. A process for the production of coarse crystalline ammonium sulphate from synthetic ammonia, consisting in adding 2 to 6 parts of carbamide to each 100 parts of ammonium sulphate solution, in crystallizing the solution and in continually adding synthetic ammonia and sulphuric acid in sufficient quantities to maintain the lye at its initial concentration.

10. A process for the production of coarse crystalline ammonium sulphate from synthetic ammonia, consisting in crystallizing the ammonium sulphate from a solution containing 100 parts of water, 2 to 8 parts of free sulphuric acid and 2 to 3 parts of carbamide per 100 parts of ammonium sulphate.

11. Coarse crystalline ammonium sulphate characterized by a content of carbamide of 0.1 to 0.5% in fine distribution.

12. Ammonium sulphate in coarse crystals characterized by a content of carbamide of less than 0.5%.

ANDREAS VON KREISLER.